(12) United States Patent
Oldroyd

(10) Patent No.: US 7,751,651 B2
(45) Date of Patent: Jul. 6, 2010

(54) PROCESSING ARCHITECTURE FOR AUTOMATIC IMAGE REGISTRATION

(75) Inventor: Lawrence A. Oldroyd, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 874 days.

(21) Appl. No.: 10/817,476

(22) Filed: Apr. 2, 2004

(65) Prior Publication Data

US 2005/0220363 A1    Oct. 6, 2005

(51) Int. Cl.
    G06K 9/32    (2006.01)
(52) U.S. Cl. .................. 382/294; 382/103; 382/293
(58) Field of Classification Search .............. 382/103, 382/293, 294
    See application file for complete search history.

(56) References Cited

U.S. PATENT DOCUMENTS

| | | | | |
|---|---|---|---|---|
| 4,635,293 | A | * | 1/1987 | Watanabe .................. 382/130 |
| 4,970,666 | A | | 11/1990 | Welsh et al. |
| 4,988,189 | A | * | 1/1991 | Kroupa et al. ............. 356/4.03 |
| 5,173,949 | A | * | 12/1992 | Peregrim et al. ........... 382/294 |
| 5,495,540 | A | * | 2/1996 | Frankot et al. ............. 382/294 |
| 5,550,937 | A | * | 8/1996 | Bell et al. .................. 382/293 |
| 5,606,627 | A | | 2/1997 | Kuo |
| 5,647,015 | A | * | 7/1997 | Choate et al. .............. 382/103 |
| 5,809,171 | A | | 9/1998 | Neff et al. |
| 5,890,808 | A | | 4/1999 | Neff et al. |
| 5,982,930 | A | | 11/1999 | Neff et al. |
| 5,982,945 | A | | 11/1999 | Neff et al. |
| 5,995,681 | A | * | 11/1999 | Lee et al. .................. 382/293 |
| 6,266,452 | B1 | * | 7/2001 | McGuire .................. 382/294 |
| 6,512,857 | B1 | | 1/2003 | Hsu et al. |
| 6,587,601 | B1 | * | 7/2003 | Hsu et al. .................. 382/294 |
| 6,694,064 | B1 | | 2/2004 | Benkelman |
| 6,738,532 | B1 | * | 5/2004 | Oldroyd .................... 382/294 |
| 6,795,590 | B1 | * | 9/2004 | Chen ........................ 382/294 |
| 2002/0012071 | A1 | | 1/2002 | Sun |
| 2005/0147324 | A1 | * | 7/2005 | Kwoh et al. ............... 382/293 |
| 2005/0220363 | A1 | | 10/2005 | Oldroyd |
| 2006/0215935 | A1 | | 9/2006 | Oldroyd |

FOREIGN PATENT DOCUMENTS

| | | |
|---|---|---|
| EP | 0841537 | 5/1998 |
| WO | WO 99/18732 | 4/1999 |

(Continued)

OTHER PUBLICATIONS

Tsai, Roger; A Versatile Camera Calibration Technique for High Accuracy 3D Machine Vision Metrology Using Off-the-shelf TV Cameras and Lenses; IEEE Journal of Robotics and Automation vol. RA-3, No. 4, dated Aug. 1987.

(Continued)

*Primary Examiner*—Bhavesh M Mehta
*Assistant Examiner*—Sean Motsinger
(74) *Attorney, Agent, or Firm*—Harness, Dickey & Pierce, P.L.C.

(57) ABSTRACT

An image registration method and apparatus for automatically registering images of different perspectives, and where a sensor image is registered with a more precise reference image such that the geocoding of the reference image can be transferred to the sensor image.

25 Claims, 5 Drawing Sheets

FOREIGN PATENT DOCUMENTS

WO        WO 02/07839        1/2002

OTHER PUBLICATIONS

Viola, Paule; Alignment by Maximization of Mutual Information; IEEE International Conference on Computer Vision, Boston, MA 1995.

Barrow, Tenenbaum, Bolles, and Wolf; Parametric Correspondence and Chamfer Matching: Two New Techniques for Image Matching; Proc. IJCAI Vision-7, 1977.

Kiremidjian; Issues in Image Registration; IEEE Proc. of SPIE vol. 758 Image Understanding and the Man-Machine Interface, New York, 1987.

Woo, Neider, Davis, Shreiner. "OpenGL Programming Guide," 3rd Ed., Addison Wesley, Inc., 1999, pp. 127-128; p. 674.

SoftPlotter User's Manual, Vision International, Autometrics, Inc. (now part of The Boeing Company), 1994, pp. 9-1ff.

Digital Point Position Data Base Performance Specification, MIL-PRF-89034, 1999.

Map Projections—A Working Manual, U.S. Geological Survey Paper 1385, 1987, pp. 145-153.

Sheikh, Y.; Khan, S.; Shah, M.; and Cannata, R. "Geodetic Alignment of Aerial Video Frames", http://server.cs.ucf.edu/~vision/papers/shah/YaserChapter.pdf, pp. 141-177, 2003.

* cited by examiner

PROCESSING ARCHITECTURE FOR AUTOMATIC IMAGE REGISTRATION

BACKGROUND

The present disclosure is directed to image registration, and more particularly to a system and method for automatically registering images of different perspectives and images from sensors with different internal geometry.

Military fighter aircraft customers need a capability to target precision guided weapons. These include JDAM guided bombs as well as higher precision weapons that will eventually become available with target strike errors of 10 feet circular error at 50% probability (10 ft. CEP).

Targeting sensors in fighter aircraft, such as forward-looking infrared (FLIR) or synthetic aperture radar (SAR), currently do not provide targeting of sufficient accuracy, even though the sensors provide images of the target area in which the pilot can precisely select a pixel location for the target. This is because sensor pointing controls of sufficient accuracy are not currently employed and are very expensive to implement, and there is insufficient knowledge of the accurate location and orientation of the aircraft. However, the sensor images presented to pilots have sufficient geometric accuracy for precision targeting if means are provided to accurately relate their geometry to ground coordinate systems at a reasonable cost.

By providing a highly precise means to register an accurately geocoded reference image to an on-board sensor image, it is possible to obtain geographic position measurements for targets with an accuracy approaching that of the reference imagery. Such high precision registration must be obtained between images of different perspectives and different internal geometries.

Sensor images do not generally portray target scenes from the same perspective as a given reference image. Reference images may typically be overhead views of the target area, although this is not a requirement. They are also produced by imaging sensors on some type of platform, and may be processed into a special geometry, such as an orthographic projection, which corresponds to a sensor viewing the scene from directly overhead at each point of the scene (a physically unrealizable form of sensor).

On the other hand, sensor images obtained by a fighter aircraft are from a point of view appropriate to the aircraft's operations, including factors such as weapon delivery needs, aircraft safety from enemy defenses, and general flight operations needs. Thus, the sensor image is typically not of the same perspective as a given reference image. Differences range from simple rotation and scale differences, to major differences in obliquity of the view. Such perspective differences make image match particularly difficult.

Sensors of different types also produce images having different internal geometry. This becomes a problem when matching images from lens-based sensors such as FLIR or optical, and synthetic imagers such as SAR. Orthographic references represent another type of synthesized image, with an internal image geometry that cannot directly match any fighter sensor image. Image photomaps or raster digital cartographic maps represent yet another form of possible reference image, but exhibit a cartographic projection, which also is unlike any sensor image geometry.

All of these differences arise from the ways that different sensors in different viewing positions treat the 3-D nature of the scene being viewed, or from the purpose of the display.

The match process of the present disclosure solves the problem of registering images of different perspectives and images from sensors with different internal geometry.

SUMMARY

Generally, the present disclosure addresses the problem of relating sensor images to ground coordinate systems with high accuracy. This is accomplished by registering or aligning the sensor image with a precision geo coded reference image. Because of this high precision, the geocoding of the reference image can be transferred to the sensor image with accuracy comparable to that of the reference image. The geocoded reference image, such as a DPPDB image provided by the National Imagery and Mapping Agency, provides a known accuracy in relation to ground coordinates. The present disclosure also solves the problem of accurately registering a small sensor image to a much larger reference image, which may be taken as a stereo pair of images for some embodiments of this disclosure where the two images have significantly different perspectives of the scene.

One aspect of this disclosure makes use of knowledge of the approximate location of the scene as it is found in the reference image to limit the search area in attempting to match the small image to the larger image. Another aspect of the disclosure is the use of approximate knowledge of the sensor location and orientation, or the sensor model, at the time when the scene is imaged, as that knowledge, combined with knowledge of the scene location, may be used to reduce the search process. Yet another novel aspect is the use of the geometry of the scene area, as known or derivable for the reference image around the scene area, or as known or derivable for the sensor image, to modify one or both of the images to have a common geometry; that is, to eliminate perspective differences that arise from the two different views of the scene as imaged separately by the sensor and the reference.

Further in accordance with the disclosure, knowledge of the sensor location and orientation and of the location of the scene is used to extract a small portion or "chip" of the reference image or images that encompasses the scene area imaged by the sensor.

Parameters of the sensor, such as field of view and resolution, together with measurements of range and directions in three dimensions to the scene depicted in the sensor image, determine a nominal "sensor footprint", or prospective location, orientation and size for the sensed scene and for the reference chip. However, these measurements are actually estimates that involve uncertainties, producing uncertainty in where the sensed area or footprint actually is and in its actual orientation and size. It can be noted that these same uncertainties also produce or involve the fundamental inaccuracies that this disclosure is intended to overcome. The uncertainties are, however, known quantities, and are usually expressed in terms of error bounds on each measurement. This makes it possible to determine an uncertainty basket around the nominal sensor footprint, such that the scene's true location and its full extent will always fall within that uncertainty basket. The uncertainty basket defines the portion of the reference image to extract as the reference chip.

The uncertainty basket is obtained by standard techniques in error estimation. For example, the scene coverage area may be determined for each possible extreme value of each estimated measurement, and the combined area from all those scene coverage areas then taken to be the uncertainty basket. Alternatively, the nominal sensor footprint, obtained from sensor parameters and measured sensing quantities, can be enlarged by a fixed amount that encompasses the "worst case" for measurement uncertainties, such as enlargement to a "bounding box" area.

It may also be desirable to limit the uncertainty basket in some circumstances. For certain perspectives, such as a low oblique looking sensor, the scene area may encompass the reference image horizon, or an extremely extended area of the reference. In cases like this, artificial constraints may be placed on the uncertainty basket, to limit the reference chip to reasonable size, although care must be taken to ensure useful coverage around the scene center along the sensor line of sight.

Taking into account the parameters of the sensor, and the known uncertainties in the locations, orientation and sensor parameters, the reference chip obtained to cover the uncertainty basket will also cover all of, or the significant part of, the scene imaged by the sensor.

The reference chip is then transformed (distorted or warped) to depict the same perspective as shown in the sensor image. An elevation or 3-D surface model of the scene area is used to ensure sufficient fidelity in the warped reference that an adequate match can be obtained. Factors such as scale difference and geometric distortions introduced by the sensing process can be taken into account to further improve the fidelity of the geometric match. Alternatively, the sensor image may be warped to match the perspective of the reference image. Again, a 3-D surface model of the scene is used to enhance the fidelity of the warp, as is information about geometric distortions peculiar to the reference image. As another alternative, both images may be warped to a common geometry, again using 3-D surface models of the scene and information about the sensor geometry and geometric distortions related to the reference image to enhance fidelity of the geometric match.

Once the geometric difference has been reduced or eliminated between the sensor image and reference image chip, the only remaining difference is an unknown translation offset between the images that must be determined in order to complete the registration. This offset can be determined by any image matching technique, such as normalized correlation, feature extraction and matching, or other image processing techniques. If the sensor and reference images are of different image types, such as a synthetic aperture radar sensor image and an optical reference image, a suitable process for cross-spectral matching should be used.

Once the translation difference has been determined, the geometric warping functions and the translation difference are combined to instantiate mathematical functions that map locations in the sensor image into locations in the reference image, and vice versa. The translation difference serves to map locations in the sensor image to locations in the synthetic perspective image, and vice versa. Often, the reference image is geocoded so that locations in the reference image can be directly associated with locations in the scene, such as specific longitude, latitude and elevation. Once the registration is accomplished, it is then possible to determine specific scene locations associated with locations in the sensor image of the scene.

Registration of the images allows pixel locations in any of the images to be associated with pixel locations in each of the other images. Thus, when a pixel location in the sensor image, such as a pixel corresponding to a target point, is selected by placing a cursor on it, the corresponding locations in the synthetic perspective image and in the reference image can be calculated, such that cursors could be placed on those corresponding pixels also. In a similar manner, when a pixel location in the synthetic perspective image is selected, corresponding pixel locations in the sensor and reference images can be computed. In a similar manner, when a pixel location is selected in the reference image, corresponding pixel locations can be calculated in each of the other images. Clearly, when a new pixel location is selected in any of the images, such as to choose a new target point, or to move the location to follow a moving target point, or to correct the point selection based on information specific to the viewpoint of any of the images, such as the relative locations of scene features and the selected point depicted in that image's view, that new pixel location can be transferred to any or all of the other images for marking or indicating the corresponding pixel locations in each of the other images.

By these means, it is possible to demonstrate, to an observer examining the images, the physical correspondences between the images, including in particular, the correspondence between points in the sensor image and points in the reference image. Thus, when the reference image has a defined spatial relationship with the actual scene, such as a geocoding, or geographic coding, that associates a specific latitude and longitude with each pixel in the reference image and its associated digital elevation model, it is possible to determine the corresponding latitude, longitude, and elevation of any selected pixel in the sensor image. Other forms of spatial relationship are readily envisioned and may be used, another example of which would be a defined, mathematical relationship between the reference image pixels and point coordinates in a computer-aided design (CAD) model of the scene area.

Of particular importance is the ability obtained using the disclosure to identify the specific location in the reference image of a target point appearing in the sensor image, when said target may not even be depicted in the reference image, such as when the reference image was recorded at a time before the target was at that location in the scene area. By means of the spatial coordinates associated with each pixel in the reference image, the spatial scene coordinates of the unreferenced target may be discovered. In addition, by showing the corresponding location of the target point as mapped to the reference image, an observer examining the sensor image and its selected target point, and the reference image and its corresponding mapped target point, can perform a judgment of the validity of the registration result, and of the target point placement in the reference image.

Another advantage obtained by relating pixel locations between images arises when the sensor and reference images have very different viewing perspectives of the scene. It then becomes possible to take advantage of the different information that is available in the multiple views with their different perspectives. For example, if the sensor image presented a more horizontal, oblique view of the scene, and the reference was an overhead view of the scene, then small pixel selection changes along the line of sight in the oblique view would translate into large pixel location changes in the reference view, indicating a low precision in the pixel mapping from sensor to reference image along the line of sight. However, by adjusting the selected pixel location in the overhead reference, a more precise selection may be obtained on the reference image than could be achieved by adjusting the location in the sensor image. Effectively, in this situation, small adjustments in the overhead reference can represent sub-pixel location changes in the oblique sensor image. This may be particularly important when the reference image is used to provide geocoded or model-based coordinates of the selected point for a high precision measurement in scene coordinates.

Further features and advantages of the present disclosure, as well as the structure and operation of various embodiments of the present disclosure, are described in detail below with reference to the accompanying drawings.

DETAILED DESCRIPTION OF THE VARIOUS EMBODIMENTS

Figure 1:
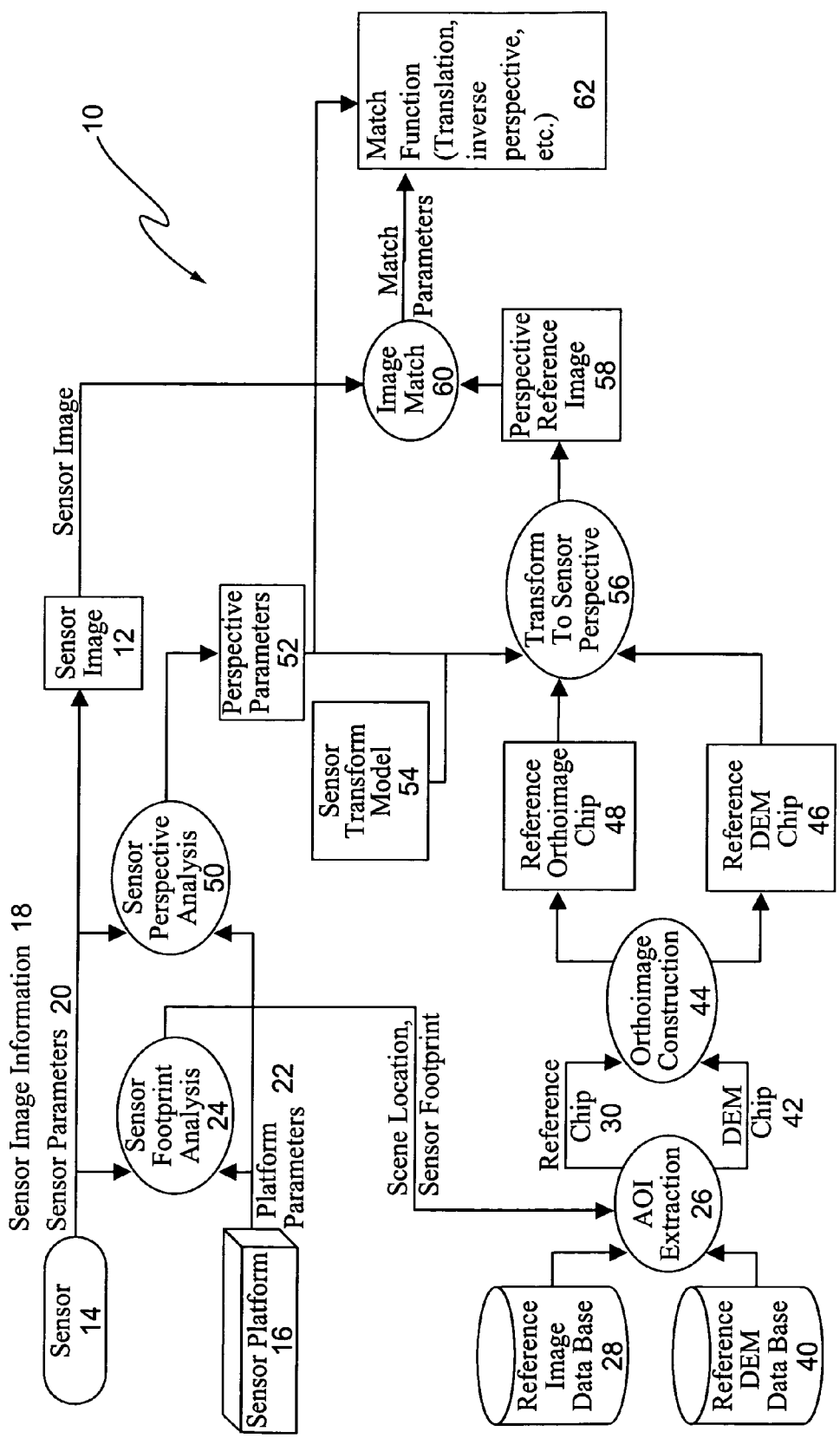
FIG. 1 is a block diagram of an embodiment of the processing architecture of the disclosure for automatic image registration.

Generally, in accordance with the present disclosure, a small sensor image is matched to a larger reference image. The large reference image typically covers a relatively large area of the earth at a resolution of approximately the same, or better than, that normally expected to be seen in the sensor image. The reference area may be any area that can be the subject of a controlled imaging process that produces an image with known geometric characteristics and know geometric relationships between locations in the image and locations in the subject area. For example, the reference area may be a portion of a space assembly or an area on the human body. This reference typically involves hundreds of thousands, or even millions or more of pixels (picture elements) in each of its two dimensions, and may comprise a pair of such images in a stereoscopic configuration that admits stereography in viewing and measurement. The reference image is geocoded so that a geographic location can be accurately associated with each pixel in the image, including an elevation if a stereo pair of images is used. For other types of reference areas, locations other than geographic are used as suited to the application, but some reference coordinate system is the basis for the location measurements.

The sensor image, on the other hand, is fairly small, typically involving a few hundred or thousand pixels in each of its two dimensions. Resolution of the sensor image usually depends on the position of the sensor relative to the scene being imaged, but the relative positions of sensor and scene are normally restricted to provide some minimal desired resolution sufficient to observe appropriate detail in the scene and comparable to the detail shown in the reference image or stereo image pair. The sensor image typically depicts a different perspective from that of the reference image, often at a much lower, oblique, angle to the scene, whereas the reference image is typically from high overhead angles. On the other hand, the perspectives may be similar, such as for a synthetic aperture radar sensor, which typically presents a generally overhead view of the scene it images. These differences in geometry, whether arising from perspective differences or differences in sensor geometry, are a problem source addressed and solved by this disclosure.

Image matching is generally difficult to achieve because it involves comparing large amounts of pixel data. As the number of possible differences between the images increases, the difficulty in achieving image matching is correspondingly magnified. The simplest case occurs when the two images differ only by a translation or shift, so that a repeated comparison of the two images with each possible trial shift difference can reveal the unknown difference. However, if the images are large, the comparison becomes quite burdensome. Alternative techniques using a comparison means in an image transform domain, such as the Fourier transform domain using the correlation theorem, can ease this burden substantially. When the images are different sizes, and the problem is to find where in the larger image the smaller image best matches, other image matching techniques may apply, but image matching remains difficult.

Where the differences between the reference and sensed images are other than simple translation, image matching becomes more complex. For example, with perspective imaging there are at least six degrees of freedom in the acquisition of each image, resulting in perspective and scale differences that complicate the matching problem. In addition, individual parameters of the sensor and the means by which the sensor acquires the image are factors that can further complicate the matching process. Without some knowledge of these various acquisition and sensor parameters, the search space for matching becomes so large as to prevent useful matching. Therefore, limiting the search area is critical because of the computational difficulty in matching images.

Numerous techniques of photogrammetry have been developed to identify acquisition parameters of sensors that produce characteristic perspective and scale properties in images. This disclosure makes use of such knowledge as is available about the images to reduce the matching problem to a tractable size so that a best match can be obtained along with a quality measure of the match to indicate its validity/invalidity.

In accordance with a embodiment of the disclosure, first the size of the reference image area to be searched is limited. With knowledge of the location of the sensor, its imaging properties (such as field of view and scale), and the location of the scene being sensed (such as the scene center), it is possible to determine the area within the reference image imaged by the sensor. This footprint of sensed image is extended by adding to it uncertainties in the locations of the sensor and scene. These uncertainties may include uncertainty as to look angles to the scene, range to the scene center, field of view, and pixel resolution in the scene. It is preferred to ensure that all uncertainties that influence the location of the sensed area within the reference image be taken into account. If the obliquity of the sensed image is low, so that a shallow view of the scene area is obtained by the sensor, it is possible that the area sensed will be quite large in the reference image. In this case, the scene area identified preferably is reduced to include amounts of area in front of and behind the scene center, as seen by the sensor, equal to a distance in front or behind the scene area of no more than twice the width of the sensed area, as seen by the sensor.

Next, a portion of the reference image sufficient to cover this defined area is extracted from the image database which stores the reference image. This "chip" is initially aligned with the reference image for simplicity of extraction. In this manner, a row of pixels in the chip is part of a row of pixels from the reference, and the multiplicity of adjacent rows of pixels in the chip will be from a similar multiplicity of adjacent rows of pixels from the reference.

The chip is then distorted or warped to conform to the known geometry of the sensor image. In accordance with the disclosure, this involves several operations which may be performed in a variety of different sequences, or as a variety of combined operations, all of which result in a similar warping. One such sequence of operations will be described, but it is to be understood that other such operations know to those skilled in the art of image processing fall within the scope of this disclosure.

The essence of the warp operation is to introduce into the reference chip the same perspective distortion as is exhibited in the sensor image. Generally, this entails the following operations:

(1) an inverse perspective transform to remove perspective distortion from the reference image, along with an operation to remove any distortions peculiar to the sensor, such as lens distortions, in the case of a lens-type sensor, or slant range compression, in the case of a synthetic aperture radar or other synthetic imaging sensor. This operation produces an orthographic image of the reference chip. If the reference image is orthographic to the scene area, or nearly so, this operation is unnecessary.

(2) a rotation to align the reference chip with the azimuthal direction of the sensor, or, in the case where the sensor is looking perpendicularly down at the scene area, to align the chip with the sensor image.

(3) a perspective transform of the reference chip to the viewpoint of the sensor, along with introduction of any distortions peculiar to the sensor, such as lens distortions, in the case of a lens-type sensor, or slant range compression, in the case of a synthetic aperture radar.

Alternatively, the sensor image may be distorted or warped to conform to the known geometry of the reference image chip by operations as described above. This alternative is preferred where there is accurate knowledge of the 3-D surface in the scene area associated with the sensor image.

Further alternatively, both the reference image chip and the sensor image may be distorted or warped to conform to a known common geometry. This alternative is preferred where there is accurate knowledge of the 3-D surface in the scene area associated with both the sensor image and the reference chip, and if the perspective differences are particularly great so that warping can be done to a common perspective that is not as different from each image individually as the two images are different from each other.

To produce a warp with best accuracy, it is preferred to use information about the 3-D nature of the surface depicted in the sensor image. This is an important consideration to any perspective warp, because the height of objects in the scene determines where the objects are depicted in the image. Only in an orthographic image, in which each point is depicted as if viewed from directly overhead, will the heights of objects not effect their visual appearance and placement.

In this described embodiment, it is assumed that a 3-D surface model is known for the reference image chip, so that a height can be obtained corresponding to each pixel in the reference image chip. During the warp, this height (together with the row and column location of each corresponding reference chip pixel, and the model parameters for the sensor and the sensor location and orientation), allows accurate calculation of where that point on the surface of the scene would have been imaged if a reference sensor had been at that location and orientation. The object is to achieve accurate alignment of the 3-D surface model with the reference image. Resolution of the 3-D surface model is also important, but match degradation is gradual with decrease in resolution. This 3-D surface model, often called a digital terrain model or DTM, may be acquired from the same source that provides the reference image.

The reference image may be a stereo pair of images in which case the stereo images are used to generate a digital terrain model (DTM) of the chip area that expresses most of the detail in the scene area, and is in accurate alignment with the chip images. This is the preferred approach if computation resources are sufficient to perform the point-by-point matching between the chip images necessary to compute stereo disparity and derive the DTM. Alternatively, the sensor may be used to acquire two images of the scene from different perspectives, and the sensor images used as a stereo pair for stereo extraction of a DTM. The DTM will thus be in accurate alignment with the sensor images, and can be used to accurately warp the sensor image to match the geometry of the reference image.

A embodiment of the disclosure will further be described with reference to the drawings. Particularly with reference to FIG. 1, there is shown a block diagram of a processing architecture 10 for automatic image registration in accordance with a embodiment of the disclosure. Generally, the process comprises the following operations:

1. A sensor image 12 is collected by a sensor 14 on a platform 16, such as an aircraft, or the hand of a robot, or any other device or structure on which an imaging sensor can be attached. Information 18 about the sensor, sensing parameters 20, and platform parameters 22 are also collected. The sensing parameters include those describing the sensor itself, such as field of view, size of the image in pixel units, resolution, and focal length. Down-look or elevation angle, as well as azimuth angle and range to the center of the imaged scene, are measured relative to the external coordinates used for the reference image. Typically, the coordinates are some known geographic coordinate system, such as WGS 84, and the reference image is geocoded, so that each reference pixel has a WGS 84 latitude and longitude coordinate location associated with it. However, it is also possible to simply use an arbitrary coordinate system associated with the reference image, and describe the platform and sensor parameters appropriately in those coordinates.

Figure 2:
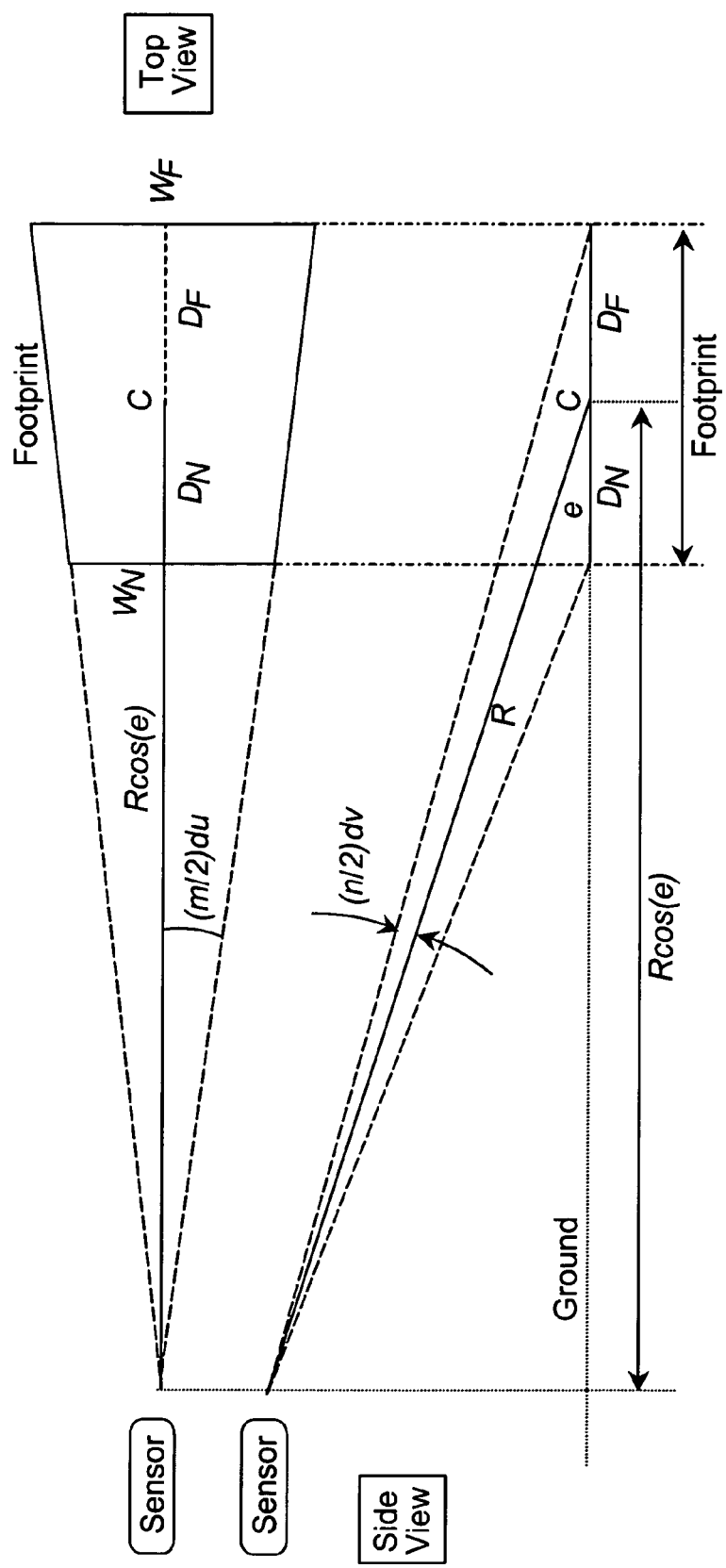
FIG. 2 is a diagram illustrating a sensor footprint derivation in accordance with a embodiment of the disclosure.

2. An analysis 24 is then conducted, using the sensor information 18, sensing parameters 20 and platform parameters 22 to determine what portion of the area covered by a reference image 28 is depicted in the sensor image. Included in this determination are uncertainties in the parameter values used in the determination so that the sensed image will fall within the selected area. This sensed area is called the "sensor footprint," or sometimes the "uncertainty basket". The derivation of the sensor footprint depends on the specific sensor used. As an example, with reference to FIG. 2, the following analysis applies to an image plane array sensor:

Sensor:
 m×n pixels
 $d_m \times d_n$ rad/pix resolution
 e depression angle
 a azimuth angle Footprint:
 C center
 R range
 $D_N, D_F$ downrange near, far
 $W_N, W_F$ width near, far Mathematical Relationships:

$$D_N = R \sin((m/2)d_m)/\sin(e+(m/2)d_m)$$

$$D_F = R \sin((m/2)d_m)/\sin(e-(m/2)d_m)$$

$$W_N = 2 \tan((n/2)d_n)(R \cos(e) - D_N)$$

$$W_F = 2 \tan((n/2)d_n)(R \cos(e) + D_F)$$

Method:
1) Compute $D_N$, $D_F$, $W_N$, $W_F$ from e and R, using sensor parameters n, m and $d_n$, $d_m$, including uncertainties in e and R.
2) Convert $D_N$, $D_F$, $W_N$, $W_F$ into 4 lat, ion offsets from C, based on C and azimuth a, assuming sensor roll is zero.
3) Get footprint corners by combining C with 4 offsets, and including uncertainty in C.

Figure 3:
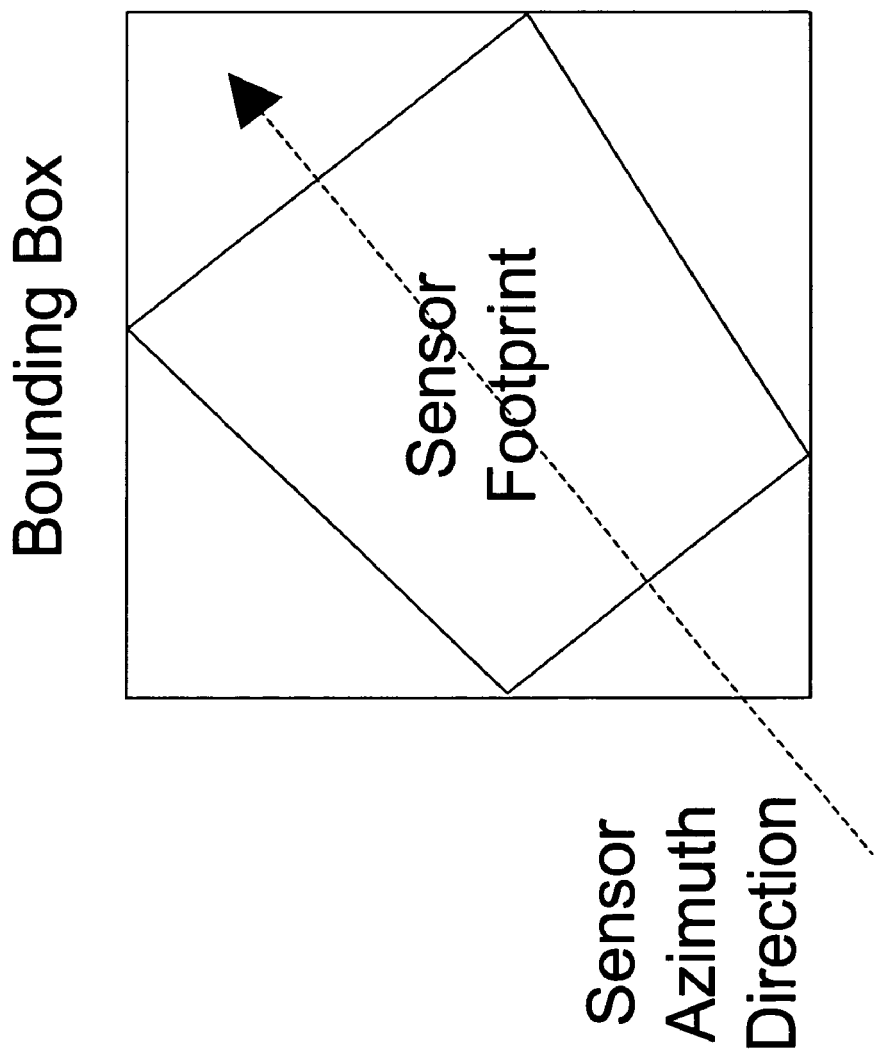
FIG. 3 is a diagram illustrating a bounding box for a sensor footprint in accordance with a embodiment of the disclosure.

3. The sensor footprint is then used to define an area of interest (AOI) 26 of the reference image 28 to be used in the registration process. This restriction is important in order to reduce the image area over which a match must be sought. A minimum bounding rectangle, in reference image coordinates, that covers the sensor footprint is the portion defined as the AOI. This small portion or "chip" 30 of the reference image is extracted for processing. Typically, the sensor footprint comprises a distorted trapezoidal area, and the reference chip is a rectangle that extends to just include the four corners and all the interior of the trapezoid, as shown in FIG. 3.

4a. If a reference digital elevation model (DEM) 40 is available, a DEM chip 42, similar to the reference chip 30, is extracted from the reference DEM 40. The DEM chip 42 may or may not have the same pixel resolution as the reference chip 30. As part of an orthoimage construction process 44, a reference DEM chip 46 and a reference orthoimage chip 48 may be constructed, the reference DEM chip 46 having resolution and post placement the same as the pixel placement in the reference orthoimage chip 48. Alternatively, an interpolation can be used with the DEM chip 42 each time height values are needed which do not have an exact association with any reference image pixel location. Pixels in a DEM are called "posts" to identify them as height measurements as distinguished from intensity measurements. Coverage by the DEM chip 42 preferably includes the entire AOI covered by the reference chip 30.

4b. If the reference image 28 consists of a left and right stereo pair, a chip is extracted from each to cover the AOI. The associated stereo model is then exploited to derive a DEM over the AOI. This DEM is accurately associated or aligned with each of the left and right chips, just as a reference DEM is associated or aligned with the reference image 28. Such stereo DEM extraction is performed using standard techniques in any number of commercially available software packages and well documented in the literature. It is the utilization of such techniques for automatic, unaided stereo extraction that is unique to the present disclosure.

4c. Alternatively, a sensor may be used to produce stereo models from time sequential images, which can then be used to produce a DEM. The two sensor images may be obtained by maneuvering the sensor platform so that two different views can be obtained of the scene. Preferably, the views are collected to have relative viewpoints most suited to construction of stereo models, such as having parallel epipolar lines. However, any arbitrary viewpoints can be used, by calibrating the camera model for the sensor images to allow reconstruction of an appropriate stereo model setup. One of many methods to calibrate camera models is the Tsai approach discussed in "A versatile camera calibration technique for high accuracy 3D machine vision metrology using off-the-shelf TV cameras and lenses," by Roger Y. Tsai, in *IEEE Journal of Robotics and Automation*, Volume RA-3, Number 4, August 1987, pages 323-344. For platforms that are moving directly towards the scene, time sequential images can be used in which one image is a magnification of part of the other image which was acquired at an earlier time. It is necessary to use sufficiently long time intervals between the sensed images in order to ensure sufficient change of viewpoint, such that the changes can be detected and accurately measured. Position changes of ten percent in individual feature locations around the periphery of the second sensor image, from the first to the second image, are generally adequate.

5a. If the reference chip 30 is not an orthographic image, or is not close to orthographic, so that it exhibits perspective distortion (say more than ten degrees off from a perpendicular view of the scene area so that there is perspective distortion to be seen), it is desirable to remove the perspective distortion by producing the orthographic reference chip 48. This is accomplished using the reference chip 30 together with the reference DEM chip 42, as well as information about the reference image perspective. Such information is normally expressed in the form of mathematical mappings that transform coordinates of the reference scene area (such as geographic coordinates when the scene is of the ground and a height coordinate from the corresponding DEM) into coordinates of the digital or film image. The stereo extraction method of constructing a DEM also yields such information. Construction of the orthographic reference image chip 48 uses standard commercially available techniques. It is the utilization of such techniques to automatically produce orthographic images in an unaided fashion that is unique to the present disclosure.

5b. If the reference chip 30 is an orthographic image, such that it depicts each pixel as if it had been imaged from directly above, or if it is nearly orthographic such that all parts of the image represent a down-look of at least 80 degrees, further processing of the reference chip is not necessary, and construction of a perspective reference can proceed.

Figure 4:
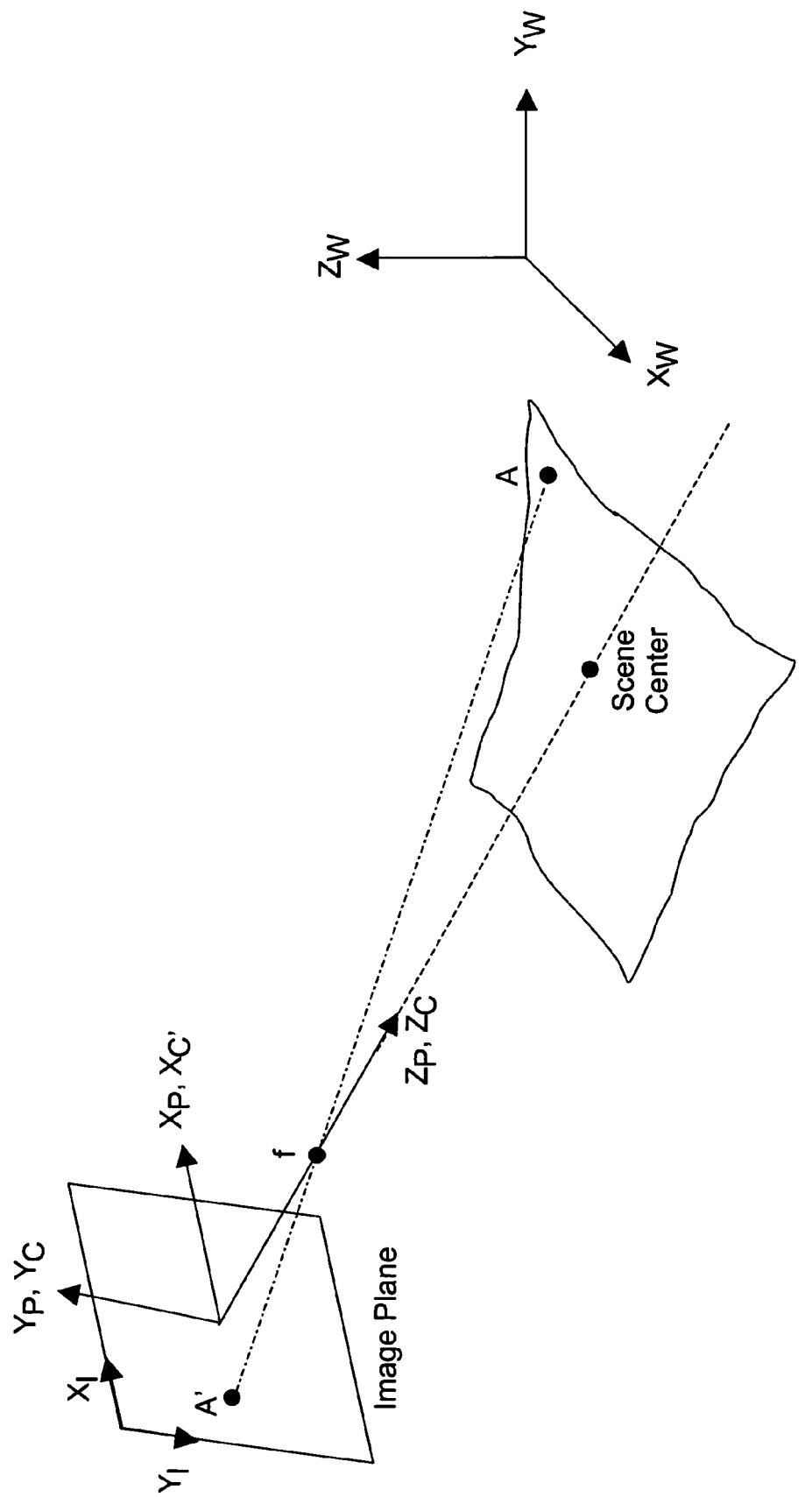
FIG. 4 is a diagram illustration a camera model (pinhole camera) with projection and inverse projection.

6. Perspective analysis 50 determines the perspective transform parameters 52 and sensor model transform 54 needed to transform 56 the orthographic reference image chip into a synthetic perspective reference image 58 that exhibits the same geometric distortion as the sensor image 12. The analysis also takes into account the various sensor parameters 20, including field of view, resolution, focal length, and distortion function of the lens. In addition, the analysis takes into account parameters of the sensing situation, including location and orientation of the sensor and its line of sight, and the center of the imaged scene. Finally, the analysis takes into account the platform parameters 22 on which the sensing occurred, including the platform's location in space. The platform's velocity and acceleration vectors may also be taken into account. The sensor model 54 can vary in complexity depending on how much or how little distortion the sensor introduces into the image it captures, and how much of this distortion must be matched to provide high quality matches. Good lens-type sensors can be reasonably modeled with a pinhole camera model. With a lower quality lens, various geometric and radiometric distortions may require modeling, such as pincushion or barrel geometric distortion, or vignette intensity shading (image is lighter in the center and darker towards the edges). A synthetic aperture radar sensor may require modeling of slant plane distortion, or that geometric correction be included in the processing done inside the sensor, and not require additional modeling for the image registration process. The complexity of the sensor model may be reduced if the image match function is able to handle certain distortions. For example, if the match process is independent of absolute image intensity values, then radiometric distortions like a vignette pattern will most likely not need modeling. The model of FIG. 4 illustrates a sensor perspective analysis 50 for a pinhole camera model.

Image Plane:
m×n pixel array
$s_m \times s_n$ spacing of pixels
f focal length

Coordinate Frames:

$X_W, Y_W, Z_W$—World coordinate frame, for locations in scene
$X_C, Y_C, Z_C$—Camera coordinate frame
$X_p, Y_p, Z_p$—Projected coordinate frame
$X_I, Y_I$—Image plane coordinate frame, x-cols, y-rows
($Z_I$ not shown, but is retained to perform inverse projection)

Coordinate Transform for Projection and Inverse Projection:

$$A' = M_{IP} M_{PC} M_{CW} A \text{ (projection)}$$

$$A = M_{CW}^{-1} M_{PC}^{-1} M_{IP}^{-1} A' \text{ (inverse projection)}$$

where
A—vector for point A in frame W
A'—vector for image of A in image frame pixel coordinates (only X and Y coordinates used)

and $M_{IP}$—matrix transform from projected frame into image frame
$M_{PC}$—matrix projection transform from camera frame into projected frame
$M_{CW}$—matrix transform (affine) from world frame into camera frame $$M_{IP} = \begin{bmatrix} m/s_m & 0 & 0 & m/2 \\ 0 & -n/s_n & 0 & n/2 \\ 0 & 0 & 1 & 0 \\ 0 & 0 & 0 & 1 \end{bmatrix}$$

$$M_{PC} = \begin{bmatrix} 1 & 0 & 0 & 0 \\ 0 & 1 & 0 & 0 \\ 0 & 0 & 1 & 0 \\ 0 & 0 & -1/f & 1 \end{bmatrix}$$

$$M_{CW} = \begin{bmatrix} a_x & b_x & c_x & t_x \\ a_y & b_y & c_y & t_y \\ a_z & b_z & c_z & t_z \\ 0 & 0 & 0 & 1 \end{bmatrix}$$

7. Construction of the perspective reference 58 can be accomplished by any number of different methods. This is a standard process done with most synthetic imaging systems, such as computer games, and numerous techniques are available. The technique used should be quite fast, and specialized methods may be required to achieve adequate speed in generating the perspective reference image. Functions found in many graphics cards for personal computers, particularly those implementing the OpenGL graphics processing standard, allow use of the computer hardware acceleration available on those cards to produce such synthetic perspective images quite rapidly, using the orthographic reference image chip 48 with its associated reference DEM chip 46.

It is necessary in forming the perspective reference to preserve the information necessary to compute the inverse perspective. This entails retaining the Z-coordinate, which is produced as each pixel of the perspective reference image is produced, and associating it specifically with the pixel location in the perspective reference image along with the intensity value for that pixel. Normally, only the X and Y coordinate locations computed for the projection (see FIG. 4) are retained and used to identify the location in the projection image at which the pixel value is to be placed. If the Z value is not computed, or not retained, then it is not possible to compute the inverse of the projection in a simple manner, as some means is needed to specify the third variable, that is, the Z component, in the 3-D coordinate transform.

Alternatively, the X and Y coordinates of the pixel in the reference image chip, or in the full reference image, in association with the pixel location in the synthetic reference image to which that reference pixel projects, may be retained. Information is then associated with the synthetic perspective reference to describe how to translate these retained X and Y coordinates back into useful reference image coordinates. Normally, this information is a simple linear transform. As a further alternative, the world coordinates of the scene points; for example, X, Y, Z, or longitude, latitude and height, in association with the pixel locations in the synthetic projected reference image to which those points correspond, may be retained.

8. Image match 60 is then carried out, between the synthetic perspective reference chip 58 and the sensor image 12. Again, there are many techniques that can be used, from a simple normalized image correlation, such as may be performed in the Fourier image transform domain, to a more robust, cross-spectral method like the Boeing General Pattern Match mutual information algorithm described in U.S. Pat. Nos. 5,809,171; 5,890,808; 5,982,930; or 5,982,945 to another more robust, cross-spectral method like a mutual information algorithm described in P. Viola and W. Wells, "Alignment by Maximization of Mutual Information" International Conference on Computer Vision, Boston, Mass., 1995. It is unique to the present disclosure that the only remaining difference between the two images after the processing described above, is a translation offset. This makes the match problem much easier to solve, requiring less computation and yielding a more accurate match result.

9. A match function 62 is then obtained by using the translation determined by the image match operation 60 to produce an offset location in the perspective reference image 58 for each pixel location in the sensor image 12. Thus, if a pixel is identified in the sensor image 12 as being of interest (for example, as representing an aim point in the scene imaged by the sensor), the match function 62 gives the offset from that pixel location to the pixel location in the perspective reference image 58 that represents that same location in the scene. The association of locations is limited by the match accuracy, which can be predicted by examining the match surface, or by using standard statistical methods with measures collected as part of the image match process 60.

Using the offset pixel location in the perspective reference image (20), and the projection Z value retained and associated with that location, the location of that same point in the scene's world coordinates is readily obtained. The appropriate transform consists of the same sequence of transforms that produces the synthetic projected reference, except each transform is mathematically inverted, and the individual transforms are applied in reverse sequence (as indicated in FIG. 4).

Alternatively, the X and Y coordinates from the chip or full reference image may be retained and associated with their corresponding locations in the synthetic perspective reference, in which case the X and Y coordinates are simply taken as the reference image location corresponding to the pixel in the synthetic perspective reference image, and hence to the sensor image pixel that was related by the match offset. As a further alternative, a world coordinate (such as an X, Y, Z, or latitude, longitude, height location), may be retained and associated with the corresponding locations in the synthetic perspective reference, in which case the world coordinate is taken as the desired reference area location. Here the images are registered by referring to common locations in the world coordinate reference system.

Figure 5:
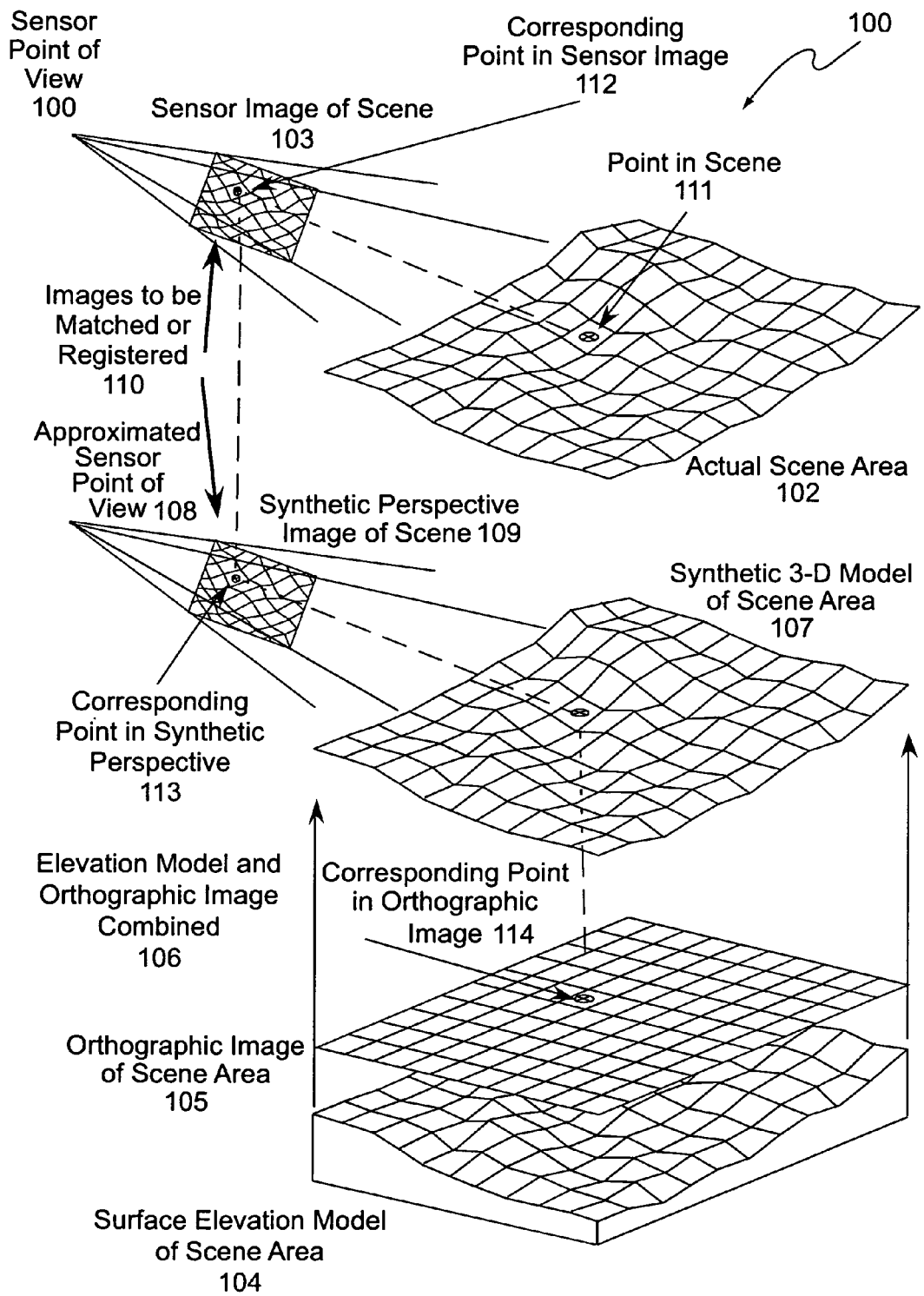
FIG. 5 illustrates an example of an image registration process in accordance with a embodiment of the disclosure.

FIG. 5 illustrates an example of an image registration process 100 of the present disclosure.

An imaging sensor at a particular point of view 101 observes an area 102 of a scene within its field of view, and captures an image 103 portraying some part of that scene. Knowledge of the general location of the scene, and the general location of the sensor, i.e., its point of view, are obtained for use in subsequent processing.

Based on the location of this scene, a portion 104 of an elevation model is extracted from a larger database of images which covers the area in which the sensor 101 is expected to capture its image 103. An orthographic image 105 of the scene area covering the extracted portion 104 of the elevation model is also extracted from a larger database of images which covers the area in which the sensor is expected to capture its image 103.

The extracted portion 104 of the elevation model and the extracted portion 105 of the orthographic image are combined (106) into a synthetic 3-D model 107 of the scene area. The synthetic 3-D model comprises an array of pixels corresponding to the orthographic image 105 where each pixel is associated with an elevation from the elevation model 104. If both the orthographic image 105 and the elevation model 104 are at the same spatial resolution so that each pixel and corresponding elevation value or "post" represent the same physical location in the scene 102, the combination comprises placing the pixel and post values together in an array at a location representing the appropriate location in the scene. However, if the orthographic image 105 and the elevation model 104 have different spatial resolutions, it may be desirable to resample the coarser array of data to have the same resolution and correspond to the same scene locations as the finer array of data. Moreover, if the orthographic image 105 and the elevation model 104 have pixels and posts that correspond to different scene locations, such as for example where the scene locations are interlaced, it may be desirable to resample one of the data sets, preferably the elevation model set, so that the pixels and posts of the orthographic image and elevation model correspond to the same scene locations.

The synthetic 3-D model 107 of the scene area is then transformed into a synthetic perspective image 109 of the scene based on knowledge of an approximate sensor point of view 108 according to a sensor perspective model. The sensor perspective model represents an approximation of how the sensor depicts the scene. It may be a standard camera model transform, such as provided by the OpenGL graphics language and implemented in various graphics processors, or it may be a specialized transform that provides faster processing or a specialized sensor model.

An example of a "specialized transform that provides faster processing" is a transform that approximates a full projective transform, but is simplified because the scene area that must be modeled is much smaller than the large, essentially unbounded area to which a standard transform like OpenGL projection must apply. In this situation, it may be possible to apply low order polynomials in a sensor model, because the high order terms in a more complex, higher fidelity model, using higher order polynomials, have small coefficients for the high order terms. With a small sensor image, the small coefficients may be sufficiently small that their contribution to the computation could be ignored. As another example, if the scene is at long range for the sensor, a simpler projection, such as the orthographic projection, may be used.

An example of "specialized sensor model" is use of a pinhole camera model to serve for a lens-type sensor, rather than a more complex model with slightly greater, but unnecessary fidelity. For example, if the sensor lens gives minor pincushion distortion, but the effect is only noticeable around the periphery of the sensor image, a pinhole camera model may be sufficient, particularly if the match portion of the image is restricted to the more central parts of the sensor image.

The sensor image 103 of the scene is registered (110) with the synthetic perspective image 109 of the scene by matching the two images.

Thus, there is provided a process to relate any location 111 in the actual scene area 102 to a corresponding location 114 in the orthographic image 105 of the scene area. This is achieved by choosing a point 111 in the actual scene 102, selecting the point 112 in the sensor image 103 of the scene which portrays the point 111, and using the match registration 110 to identify the corresponding point 113 in the synthetic perspective image 109. This corresponding point 113 in turn provides a corresponding point 114 in the orthographic image 105 of the scene area from which the synthetically projected point was produced. These correspondences are indicated by the dashed lines shown in FIG. 5. Direct and rapid inversion of the perspective transform used to generate the synthetic perspective image 109 utilizes the surface elevation model 104 to provide a unique location in the orthographic image 105 for the corresponding point 114.

Assuming that the orthographic image 105 of the scene area has precise scene locations associated with each pixel, such as would be the case if the image is geocoded so that each pixel has an associated latitude and longitude, a precise scene location can be associated with all four corresponding points 111-114.

While the present disclosure has been described by reference to specific embodiments and specific uses, it should be understood that other configurations and arrangements could be constructed, and different uses could be made, without departing from the scope of the disclosure as set forth in the following claims.

What is claimed is:

1. A method for automatically registering a sensed image with a reference image, comprising:

using a sensor mounted on a platform, acquiring an image of a scene and at least one sensor parameter that indicates a perspective of the sensor relative to the scene;

determining a footprint of the sensor relative to a coordinate system associated with a reference image database and a digital elevation database, the footprint including at least a portion of the scene in the sensor image;

accessing the digital elevation database to obtain a reference digital elevation model geocoded in the coordinate system and whose geographic extent encompasses an area that includes the sensor footprint;

accessing the reference image database to obtain a reference image geocoded in the coordinate system and that encompasses an area that includes the sensor footprint;

generating a synthetic 3-D model of an area around a center of the scene by combining the geocoded reference digital elevation model and the geocoded reference image such that each pixel of the geocoded reference image is associated with an elevation from the geocoded reference digital elevation model;

transforming the synthetic 3-D model into a synthetic perspective image of the scene, the transforming based on a type of the sensor and the at least one sensor parameter; and registering the sensor image of the scene with the synthetic perspective image to geocode the sensor image using a mutual information model;

said method performed by one or more processors.

2. The method of 1, wherein a type of the sensor further comprises at least one of the following: a lens camera, and a synthetic aperture radar sensor.

3. The method of claim 1, wherein the at least one sensor parameter further comprises a plurality of sensor parameters that include at least a field of view of the sensor, size of the image in pixel units, a resolution of the image, a focal length, an elevation angle and an azimuth angle.

4. The method of claim 3, wherein registering the sensor image of the scene with the synthetic perspective image further comprises:
   determining a projection for the sensor image based on the type of the sensor and the plurality of sensor parameters; and
   determining an inverse projection for the sensor image based on the type of the sensor and the plurality of sensor parameters.

5. The method of claim 1, further comprising:
   determining a location of the sensor relative to the scene;
   determining projection parameters for the perspective of the sensor relative to the scene based on the location of the sensor relative to the scene and the center of the scene; and
   determining an inverse projection for the perspective of the sensor relative to the scene based on the location of the sensor relative to the scene and the center of the scene.

6. The method of claim 4, wherein accessing the reference image database further comprises:
   retrieving reference data that includes a perspective of the reference image relative to the scene; and
   retrieving a reference projection model for the reference image.

7. The method of claim 6, wherein transforming the synthetic 3-D model into the synthetic perspective image further comprises:
   determining a projection of the reference image based on the reference data and the reference projection model; and
   determining an inverse projection of the reference image based on the reference data and the reference projection model.

8. The method of claim 7, further comprising:
   using the inverse projection of the reference image to remove projective distortion from the reference image.

9. The method of claim 7, further comprising:
   transforming the synthetic 3-D model into an orthographic projection using the inverse projection of the reference image.

10. The method of claim 7, wherein the projection parameters for the perspective of the sensor define a sensor projection model, and the sensor projection model and the reference projection model are the same projection model.

11. The method of claim 7, wherein the projection parameters for the perspective of the sensor define a sensor projection model, and the sensor projection model and the reference projection model are different projection models.

12. The method of claim 7, wherein registering the sensor image of the scene with the synthetic perspective image further comprises:
   determining a translation offset between the sensor image and the synthetic perspective image; and
   matching pixels in the sensor image to pixels in the synthetic perspective image using the translation offset.

13. The method of claim 12, wherein matching pixels in the sensor image to pixels in the synthetic perspective image further comprises:
   matching pixels in the sensor image to pixels in the synthetic perspective image using the inverse projection of the perspective of the sensor.

14. The method of claim 1, wherein registering the sensor image further comprises:
   associating the geocode of a pixel in the reference image with the geocode of a pixel in the sensor image to geocode the sensor image.

15. A method for automatically registering a sensed image with a reference image, comprising:
   using a sensor mounted on a platform, acquiring an image of a scene and at least one sensor parameter that indicates a perspective of the sensor relative to the scene;
   determining a footprint of the sensor relative to a coordinate system associated with a reference image database, the footprint including at least a portion of the scene in the sensor image;
   accessing the reference image database to obtain a reference image geocoded in the coordinate system and that includes a portion of a right stereo image and a portion of a left stereo image, which encompasses an area that includes the sensor footprint;
   processing the left and right stereo images to derive a reference digital elevation model geocoded in the coordinate system and whose geographic extent encompasses an area that includes the sensor footprint;
   generating a synthetic 3-D model of an area around a center of the scene by combining the geocoded reference digital elevation model and the geocoded reference image such that each pixel of the geocoded reference image is associated with an elevation from the geocoded reference digital elevation model;
   transforming the synthetic 3-D model into a synthetic perspective image of the scene, the transforming based on a type of the sensor and the at least one sensor parameter; and
   registering the sensor image of the scene with the synthetic perspective image to geocode the sensor image using a mutual information model;
   said method performed by one or more processors.

16. The method of claim 15, wherein a type of the sensor further comprises one or more of the following: a lens camera, and a synthetic aperture radar sensor.

17. The method of claim 15, wherein the at least one sensor parameter further comprises a plurality of sensor parameters that include at least a field of view of the sensor, size of the image in pixel units, a resolution of the image, a focal length, an elevation angle and an azimuth angle.

18. The method of claim 17, wherein registering the sensor image of the scene with the synthetic perspective image further comprises:
   determining a projection for the sensor image based on the type of sensor and the plurality of sensor parameters; and
   determining an inverse projection for the sensor image based on the type of the sensor and the plurality of sensor parameters.

19. The method of claim 15, further comprising:
   determining a location of the sensor relative to the scene;
   determining projection parameters for the perspective of the sensor relative to the scene based on the location of the sensor relative to the scene and the center of the scene; and
   determining an inverse projection for the perspective of the sensor relative to the scene based on the location of the sensor relative to the scene and the center of the scene.

20. The method of claim 19, wherein accessing the reference image database further comprises:
   retrieving reference data that includes a perspective of the reference image relative to the scene; and
   retrieving a reference projection model for the reference image.

21. The method of claim 20, wherein transforming the synthetic 3-D model into the synthetic perspective image further comprises:
   determining a projection of the reference image based on the reference data and the reference projection model; and
   determining an inverse projection of the reference image based on the reference data and the reference projection model.

22. The method of claim 21, further comprising:
   using the inverse projection of the reference image to remove projective distortion from the reference image; and
   transforming the synthetic 3-D model into an orthographic projection using the inverse projection of the reference image.

23. The method of claim 21, wherein registering the sensor image of the scene with the synthetic perspective image further comprises:
   determining a translation offset between the sensor image and the synthetic perspective image; and
   matching pixels in the sensor image to pixels in the synthetic perspective image using the translation offset.

24. The method of claim 23, wherein matching pixels in the sensor image to pixels in the synthetic perspective image further comprises:
   matching pixels in the sensor image to pixels in the synthetic perspective image using the inverse projection of the perspective of the sensor.

25. The method of claim 15, wherein registering the sensor image further comprises:
   associating the geocode of a pixel in the reference image with the geocode of a pixel in the sensor image to geocode the sensor image.

* * * * *